United States Patent [19]

Gut et al.

[11] 4,364,879

[45] Dec. 21, 1982

[54] METHOD FOR FORMING A COATED ARTICLE INCLUDING ULTRA-VIOLET RADIATION OF THE COATING

[75] Inventors: Karl Gut, Benken; Marcel Voegeli, Schaffhausen, both of Switzerland; Haiko Schneider, Hemmenhofen, Fed. Rep. of Germany

[73] Assignee: Georg Fischer Aktiengesellschaft, Schaffhausen, Switzerland

[21] Appl. No.: 192,518

[22] PCT Filed: Jul. 18, 1979

[86] PCT No.: PCT/CH79/00104

§ 371 Date: Mar. 21, 1980

§ 102(e) Date: Mar. 20, 1980

[87] PCT Pub. No.: WO80/00249

PCT Pub. Date: Feb. 21, 1980

[30] Foreign Application Priority Data

Jul. 21, 1978 [CH] Switzerland ................. 7888/78
Jul. 13, 1979 [CH] Switzerland ................. 6527/79

[51] Int. Cl.³ .................... B29C 25/00; B29D 9/00
[52] U.S. Cl. ........................... 264/22; 264/45.1; 264/129; 264/232
[58] Field of Search ............ 264/22, 109, 129, 133, 264/134, 137, 132, 45.1, 232; 427/54.1

[56] References Cited

U.S. PATENT DOCUMENTS

| | | | |
|---|---|---|---|
| 2,875,092 | 2/1959 | Cline | 427/54.1 |
| 3,056,704 | 10/1962 | Rothweiler et al. | 264/128 |
| 3,286,006 | 11/1966 | Annand | 264/109 |
| 3,354,251 | 11/1967 | Thoma et al. | 204/159.19 |
| 3,410,936 | 11/1968 | Juras | 264/128 |
| 3,721,579 | 3/1973 | Barrett . | |
| 3,839,265 | 10/1974 | Stoll et al. | |
| 3,882,189 | 5/1975 | Hudak | 204/159.19 |
| 4,013,806 | 3/1977 | Volkert et al. | 427/54.1 |
| 4,016,306 | 4/1977 | Miyagawa et al. | 427/54.1 |
| 4,079,031 | 3/1978 | Sardessai et al. | 525/504 |
| 4,080,401 | 3/1978 | Kassner | 525/440 |
| 4,107,229 | 8/1978 | Tideswell et al. | 525/504 |
| 4,138,299 | 2/1979 | Bolgiano | 427/54.1 |
| 4,173,594 | 11/1979 | Dyszlewski | 525/480 |
| 4,201,823 | 5/1980 | Russell | 264/101 |

FOREIGN PATENT DOCUMENTS 1908549 9/1969 Fed. Rep. of Germany .
2111149 9/1971 Fed. Rep. of Germany .
2254146 5/1974 Fed. Rep. of Germany .

OTHER PUBLICATIONS

Randolph et al., Plastics Eng. Handbook, Reinhold (1960), p. XIVI.

Primary Examiner—Willard E. Hoag
Attorney, Agent, or Firm—Toren, McGeady & Stanger

[57] ABSTRACT

In the production of a body of filled plastics material, it is started from a self-supported article with open pores which can be obtained in the conventional manner. A reaction material is placed in the pores of the molded article. The pores of the molded article are sealed prior to final hardening. This can be done by means of an ultraviolet radiation source. Prior to sealing, the molded articles, without the danger of leakage of the reaction material, can be temporarily placed in a glycol/glycerol bath. The polyester resin of the coating is irradiated with UV through the glycol or glycerol bath.

4 Claims, No Drawings

METHOD FOR FORMING A COATED ARTICLE INCLUDING ULTRA-VIOLET RADIATION OF THE COATING

The invention relates to a method of producing bodies of filled plastics material in accordance with the preamble of claim 1. The invention also relates to a product of this method.

Methods according to the preamble of claim 1 are already known, e.g. from German Offenlegungsschrift 19 08 549. An unsolved problem in methods of this type resides in preventing a leakage of the reaction (resin) substance until its final setting. It is possible to adjust the pot life of the reaction substance as short as desired, so that, in this case, the gelation in the molded article takes place more rapidly and does not leak, however, this measure would not be economical, because the reaction substance would gel prematurely in the respective container, in the vacuum chamber and in the intermediate lines; this makes the substance useless. On the other hand, in the case of a long pot life, the viscosity of the reaction substance is so low that significant losses result from leakage from the molded article. Also in the case of heating in a hardening furnace, the viscosity is initially lowered until a sufficient cross-linking occurs, so that additional reaction substance is lost which, in addition, contaminates the furnace. As a result, the properties of the bodies filled with plastics material, also called composite bodies, are impaired. For example, the tensile strength values of the above-mentioned German Offenlegungsschrift, without the aid of metal inserts, are below 20 N/mm$^2$.

It is the object of the invention to avoid the above-mentioned disadvantages and to increase or at least maintain the mechanical strength, particularly the tensile strength, of composite bodies while simultaneously simplifying and reducing the cost of their production. Also, the bodies should have a minimum residual porosity and a minimum susceptibility to liquid media, such as acids, lyes, organic solvents and waste water.

In accordance with the invention, this object is met by the teaching of claim 1. Advantageous and/or further developments according to the invention can be found in the subclaims.

Only when the filler, the preliminary binder and the reaction substance are adjusted to one another with respect to quality and quantity, optimum properties of the composite body can be obtained, because the filler grains must reach a frictional and stable connection with the silane adhesion mediator, the preliminary binder and the reaction substance. The leakage losses are negligible because of the sealing of the molded article. In addition, the furnace is protected. Very long pot lives of the reaction substances to be processed can be chosen. Advantageously, a dust-free and inexpensive quartz sand of high quality can be used as filler. In any case, the preliminary binder may not be absorbed by the filler, because this would result in a loss of preliminary binder. However, the quartz grain surface should be well coated by the preliminary binder. The preliminary binder should preferably be cold-setting, so that no costs are incurred for heating. All of this benefits the quality of the final product as well as its economy.

The self-supporting and inherently stable molded article with open pores can be produced in various ways which are known per se. Moreover, the conventional and proven molding tools can be used. For example, the molded article can be produced by injecting the filler and the binder into the cavity of a molding tool by means of an air flow or an air blast. Through a chemically released setting process, the binder can harden rapidly, so that the molded article can be quickly removed from the molding tool which means that the coefficient of utilization of the molding tool is high. In such molded articles, a volumetric compression ratio of a minimum of 0.5 to up to 0.85 can be achieved without difficulty. In the case of a compression ratio of 0.8, the volume of the molded article is filled up to 80% with filler, so that now only the pore volume of 20% must be filled with the reaction resin material. Since the resin material is more expensive than, for example, sand as filler, this small portion, as far as the components are concerned, is advantageous with respect to costs.

A vacuum pressure impregnating unit can be followed by a commercially available ultraviolet radiation source. Although acrylates do also react with ultraviolet radiation, they must be considered less suitable since they are more brittle. Condensation resins, e.g. phenol formaldehyde, and addition resins, e.g. epoxide, cannot be used with an ultraviolet radiation source. Best results can be expected with unsaturated polyester resins which are significantly less expensive than epoxide.

To become independent from time and to improve the final product, advantageously a dipping liquid can be used which, with respect to density, approximately corresponds to the density of reaction material. As a result, it is not absolutely necessary to feed the molded articles which have been immersed in the reaction material to the ultraviolet radiation source immediately after they have been removed from the vacuum impregnating chamber. However, this is desirable, because experiments have shown that, under the influence of ultraviolet radiation, the reaction material and the air oxygen result in an adhesiveness within a very short time which is difficult to eliminate; this adhesiveness is completely avoided when the ultraviolet radiation takes place in the bath. The liquid must be indifferent to the reaction material and transparent for ultraviolet radiation, so that the sealing of the pores and the gelation of the outer layers of the reaction material by means of the ultraviolet radiation are possible in the liquid container. Glycol and glycerol are suitable; their mixture can be adjusted exactly to the density of the reaction material.

Further advantages reside in the lack of shrinkage during the hardening of the composite body, on the one hand, and in the lack of a residual shrinkage, measured within a time period of 2 to 250 days after the production, on the other hand.

Furthermore, the composite body produced in accordance with the invention has an extremely good resistance in many inorganic chemicals, such as aqueous acids, bases and salts. Organic chemicals, with the exception of certain solvents, do also not lead to damage. The same type of duroplastic material can be used as preliminary binder and as the reaction resin material. A total portion of duroplastic material of about 20% by weight can be obtained in this manner.

For the production of composite bodies according to the invention, particularly suitable as fillers have been found particulate, brittle, mineral materials, preferably quartz, but also basalt, chromium ore, zirconium silicate, slate, mica, calcium carbonate, porous chamotte, olivine, glass, granular iron, iron powder, iron oxide, granular aluminum, aluminum powder, aluminum oxide, magnetite, barium ferrite, soot, graphite, kaolin, chalk, potassium titanate and foundry slag. However, organic materials can possibly also be used, such as ground substances, e.g. wood dust, coconut shells, cork. Also suitable would be fibrous particles, for example, glass fibers, metal fibers, such as steel wool, polypropylene fibers and wood fibers.

It has been found that the strength of the bodies produced in accordance with the invention depends, among others from the grain size and the grain size distribution of the fillers used. Therefore, for each composition of the fillers, an optimum limiting grain size is to be used which, together with the binders used, results in a highest possible coefficient of consolidation for the body according to the invention. For a further increase of the tensile strength, silanized fillers can be used.

Generally, a grain size range of between 10 μm and a maximum of one-third of the thinnest wall thickness of the molded body should be used for at least 90% by weight of the filler.

The fillers used can either be essentially spherical, such as sand grains, or also fibrous, depending on the desired tensile strength.

As non-hydraulic preliminary binders, for example, the following materials can be considered:

Water glass which is subsequently gassed with $CO_2$, furane resin (thermal or catalytic), urea melamine resin, vinyl acetate resin, phosphorous chlornitrile, sulfite liquor and linseed oil, isocyanates, isocyanate with resol, isocyanate with melamine, unsaturated polyester resins hardened with γ-rays, phosphoric acid with aluminum oxide or monoaluminum phosphate, phenol resin, acrylate resin, resin in solvent, Styropor in toluene, silester.

To ensure the inherent stability during manipulations and during the filling with reaction resin material, the binder content should be at most 10% by weight, preferably in the minimum concentration, i.e. less than 2% by weight, relative to the molded article. When silanized fillers are used, the compatibility with the binder should be considered. The preliminary binder can be silanized. Also, when hydrous binders are used, the content of chemically or physically bounded water in the molded article with open pores should preferably be zero, and at most 1% by weight, in order not to impair the subsequent hardening of the reaction resin.

The conventional additions can be added to the reaction resins, such as catalysts, accelerators, stabilizers, coloring substances, radiation absorbing agents, adhesion mediators, lubricants, thixotropic agents, etc. The hardening or cross-linking should take place with the utilization of pressure or of temperature by polyaddition on the preliminary binder or polycondensation on the preliminary binder, or by radical polymerization.

It may be very advantageous to heat the molded article before filling it with reaction resin material, so that the incorporated liquid resin is caused to harden or gel. Also, the reaction resin material can advantageously be cooled in order to obtain a long pot life. The gelation process can best be carried out in a heated medium and preferably under increased pressure.

Due to the already mentioned high portion of filler and its high compression ratio, the properties of the new composite body are to a large degree determined by its specific characteristics. Accordingly, by a suitable selection of the filler, it is also possible to produce bodies with an increased dielectricity constant, with a certain ohmic resistance, with magnetic properties or with a certain thermal capacity.

The possibilities of application of the composite body produced according to the invention are extremely diverse, coincide essentially with those of synthetic resin concrete and include the following articles:

Clutch cable shock absorbers, road cappings, insulators, pipes, railroad ties, kilometer posts, border markings, guide markings, fence posts, pickets, drain pipes, cable ducts, sectional members for the regulation of brook beds, segments for the construction of settling basins, shafts, cups, sewer pipes, collecting basins for sewage, caissons, duct covers, balance wedges, bridge abutments, tubs, facades, wall elements, flat roof elements, window frames, window sills, skirting boards, radiator cover plates, door frames, plinths, machine foundations, wear-resistant plates, floor coverings, stair steps, decorative linings, table boards, ceiling elements, sinks, toilets, troughs for showers, flushing water containers, feed troughs, tombstones, products for arts and crafts, gears, rollers, e.g. rollerskate rollers, bricks, flower pots, landings, curbstones, vases, benches plant buckets, housings, cam discs, pan handles, lid knobs, bowls, fuses, artificial stones, dielectrics, floor tiles, wall tiles, paving stones, containers, water basins, ash trays, brook shells.

In the following example, all statements in percent relate to the fully hardened composite body.

EXAMPLE 760 g or 60% by volume quartz sand are mixed with 10 g of a binder which contains phenolformaldehyde resin, isocyanate resin and a catalyst, and are added to a molding tool in the conventional manner. The resulting molded article is heated to 80° C. and is evacuated in a vacuum chamber. 240 g of a reaction resin material of an unsaturated polyester resin which contains as the principal component Polylite 8007 and additionally a catalyst, an initiator and an ultraviolet radiation sensitizer, are added to the molded article. During mixing of the reaction resin material components, possibly existing air bubbles can be removed by means of a vacuum. The molded article flooded with the reaction resin material is subsequently transferred into a glycol bath and is then subjected to ultraviolet radiation for several minutes. The gelation of the inner layer takes several hours, in the order of magnitude of 10 hours. It can take place at a low temperature, for example, −10° C., in a storage area. During storage, the reaction material can cross-link, which best takes place at room temperature or at a low temperature, in order to avoid that the material expands and the sealing sheath is ruptured. The final hardening takes place at, for example, 40° C. for four hours.

The body produced in this manner had the following properties:
Filler content—78.5% by weight
Binder content—1.0% by weight
Duroplast material content—20.5% by weight
Tensile strength—25 N/mm$^2$
Modulus of elasticity—$2.6 \times 10^3$ N/mm$^2$
Linear shrinkage—<0.1%
Elongation at tear—1.1%
Absorption of water at room temperature after 60 days—0.5%

The use of a preliminary binder consisting of phosphoric acid and aluminum oxide is possible, but not best.

The properties of a composite body can be improved by reinforcing inserts and/or anchorings, for example, of metal.

We claim:

1. In a method for making molded plastic articles, wherein a particulate filler is mixed with a hardenable resin to form a mixture and the mixture is deposited in a mold and the resin of said mixture is hardened to form a self-supporting molded article with open pores, the molded article is placed under vacuum, the pores are filled with a hardenable material, and the hardenable material is hardened in a final curing step to form a molded article; the improvement comprising:

(a) coating the molded article with a liquid, ulta-violet light curable, unsaturated polyester resin composition, (b) immersing the polyester coated article in a bath of glycol or glycerol, and (c) curing said polyester resin with ultra-violet light by irradiating said polyester resin coating on said article while said article is in said bath.

2. The method of claim 1 wherein said polyester resin and the liquid of said bath have approximately the same densities.

3. The method of claim 1 including providing an insert member in said molded article.

4. The method of claim 3 wherein said insert member is metal.

* * * * *